United States Patent [19]

Meguro et al.

[11] 4,396,949

[45] Aug. 2, 1983

[54] TELEVISION SOUND RECEIVER

[75] Inventors: Toshiaki Meguro, Akishima; Susumu Tsuchida, Yokohama, both of Japan

[73] Assignee: Sony Corporation, Tokyo, Japan

[21] Appl. No.: 327,087

[22] Filed: Dec. 3, 1981

[30] Foreign Application Priority Data

Dec. 12, 1980 [JP] Japan .................................. 55-176319
Feb. 10, 1981 [JP] Japan .................................. 56-18450

[51] Int. Cl.³ .......................... H04N 5/60; H04B 1/16
[52] U.S. Cl. ................................... 358/197; 358/198; 455/175
[58] Field of Search .................... 455/175, 182, 194; 358/143, 144, 197, 198

[56] References Cited

U.S. PATENT DOCUMENTS 3,360,604  12/1967  Hansen .............................. 358/198
4,272,788  6/1981  Ogita ................................. 358/198

OTHER PUBLICATIONS

"Intercarrier BVEE Phenomena Analysis and Cures" by Fockens et al., IEEE Transactions on Consumer Electronics, vol. CE-27, No. 3, Aug. 1981.

Primary Examiner—Jin F. Ng

Attorney, Agent, or Firm—Lewis H. Eslinger; Alvin Sinderbrand

[57] ABSTRACT

A televison sound receiver includes an input terminal for receiving a television sound signal, a tuner connected to the input terminal, a channel selector connected to the tuner, an intercarrier sound demodulating circuit connected to the tuner, a split-carrier sound demodulating circuit connected to the tuner, a sound signal output terminal, and a switching device for selectively connecting one of the intercarrier and split-carrier sound demodulating circuits between the tuner and the sound signal output terminal and the switching device. The switching device includes a timing generator connected to the channel selector for generating a pulse signal of a predetermined period responsive to a channel selection period of the channel selector, a first operational circuit for normally connecting the split-carrier sound demodulating circuit operatively between the tuner and the sound signal output terminal, and a second operational circuit for connecting the intercarrier sound demodulating circuit operatively between the tuner and the sound signal output terminal during the predetermined period.

6 Claims, 5 Drawing Figures

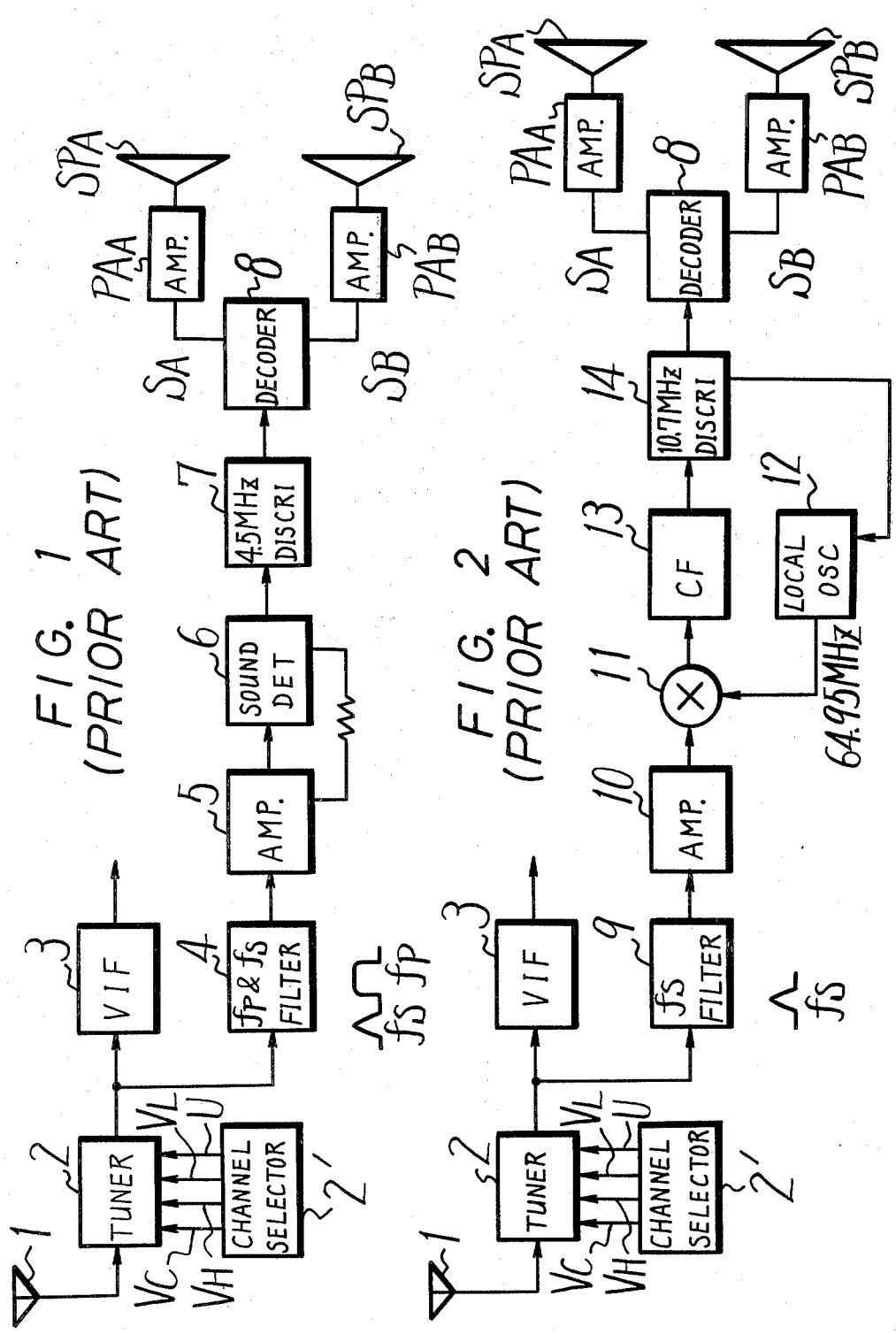

TELEVISION SOUND RECEIVER

BACKGROUND OF THE INVENTION

1. Field of the Invention

This invention relates to a television sound receiver and more particularly to a television sound receiver which improves the tone quality of the television sound signal.

2. Description of the Prior Art

As television multiplexed sound broadcasting becomes more widely used, the tone quality of the television sound signal, which has been more or less overlooked up till now, becomes more worthy of notice.

In receiving and demodulating television sound signals, intercarrier and split-carrier sound demodulating systems are typically employed.

FIG. 1 is a system diagram showing an intercarrier sound demodulating system in which a signal received at an antenna 1 is supplied to a tuner 2, such as an electronic tuner (ET), from which an intermediate frequency (IF) signal containing a video carrier component with a frequency of $f_p = 58.75$ MHz and a sound carrier component with a frequency of $f_s = 54.25$ MHz is produced. A channel selector 2' is connected to and controls selection of the signal to be detuned by tuner 2. The IF signal produced by tuner 2 is supplied to a video intermediate frequency amplifier 3 as well as to a filter 4 which is provided to extract only the video and sound carrier components. An output signal from filter 4 is supplied through an amplifier 5 to a sound detector 6. Channel selector 2' supplies a tuning voltage $V_C$ and band-switching signals $V_L$, $V_H$ and U to tuner 2. When band-switching signals $V_L$, $V_H$ and U are respectively supplied to tuner 2, the mode of operation of tuner 2 switches to tuning of a television signal which occupies a low channel of a very high frequency (VHF) band, a high channel of the VHF band and any channel of an ultra high frequency (UHF) band. From sound detector 6 a frequency modulated (FM) sound signal is produced having a beat frequency of 4.5 MHz which is equivalent to a frequency difference between the video and sound carrier component and is applied to and frequency demodulated by a frequency discriminator 7. An output signal from frequency discriminator 7 is supplied to a multiplexed sound signal decoder 8. Decoder 8 produces normal monaural sound signals as output signals $S_A$ and $S_B$ when the transmitted television sound signal is not multiplexed and a left-channel sound signal as one output signal $S_A$ and a right-channel sound signal as output signal $S_B$ when the transmitted television sound signal is multiplexed such as in stereo sound. The respective outputs $S_A$ and $S_B$ from decoder 8 are supplied through output amplifiers $PA_A$ and $PA_B$ to respective speakers $SP_A$ and $SP_B$. One part of the signal derived from sound detector 6 is fed back to amplifier 5 so as to provide an automatic gain control (AGC) thereto.

FIG. 2 is a system diagram showing an outline of the split-carrier sound demodulating system wherein an output signal of tuner 2, which is controlled by channel selector 2', is supplied to a surface acoustic wave filter 9 having a band pass characteristic such that only the sound carrier component with the frequency of $f_s = 54.25$ MHz is produced. This sound carrier component is applied through an amplifier 10 to a mixer 11. Additionally, a local oscillator 12 is provided which supplies an oscillating signal of 64.95 MHz to mixer 11 and thereby permits the oscillating and sound carrier signals to be multiplexed with each other. Accordingly, mixer 11 produces an output signal having a frequency equal to the frequency difference between the sound carrier component and the oscillating signal. The mixer output signal is supplied via a ceramic filter 13 to and demodulated at a frequency discriminator 14 which produces an output of signal that is supplied to multiplexed sound signal decoder 8 and thereby produces the same output signals $S_A$ and $S_B$ as shown in FIG. 1.

The output signal of frequency discriminator 14 is supplied to local oscillator 12 forming an automatic frequency control (AFC) loop, to control the local oscillating frequency of local oscillator 12.

Since the aforementioned intercarrier sound demodulating system utilizes a frequency component of 4.5 MHz, which is the difference between the video and sound carrier components, the intercarrier sound demodulating system has an inherent drawback in that the video carrier component is apt to be mixed with the sound channel resulting in interference such as buzz noise.

In a monaural sound broadcasting when the transmitted sound signal is not multiplexed, a high band component of the sound signal deemphasized by a deemphasis circuit of a sound FM signal wave detector resulting in a somewhat acceptable level of buzz noise. In contrast thereto, when the sound signal is multiplexed, as in the present invention, the tone quality of the television sound is greatly significantly and undesirably influenced by the buzz noise interference since it is necessary to extract a sub-channel sound signal before the entire sound signal is deemphasized by the deemphasis circuit.

During operation of the split-carrier sound demodulating system, the sound and video carrier components are separated from each other. Thus the sound carrier component is never influenced by the video signal component and hence the sound signal reproduced by the receiver has a good tone quality.

There are, however, drawbacks in using a split-carrier sound demodulating system. For example, since the sound and video carriers are adapted to be processed independently of each other in the split-carrier sound demodulating system, when carrier, if the local tuner oscillating frequency is deviated and if the AFC is unlocked, when presetting the channel by the preset tuner or fine tuning, the television sound signal can be lost even though the picture is still being reproduced on the screen of the receiver. Of course, the loss of a sound signal may not be readily noticed by viewers in general if the television receiver comprises only a video monitor having no sound playback apparatus or the demodulating decoder of the multiplexed sound signal is physically separated and located far from the television screen. But, when both the television receiver and the demodulating decoder are integrally constructed and if only the picture and not the sound signal is reproduced, a viewer may not understand, what has happened and may become puzzles or confused over the loss of the sound signal.

In contrast thereto, with respect to the intercarrier sound demodulating system, since the frequency difference between the video and sound carriers is utilized, the picture and sound of the television receiver will always be synchronized with each other such that the sound signal can never be lost while the picture signal is reproduced. Additionally, although in receiving a very high frequency (VHF) signal, no buzz or buzz beat noise occurs in the split-carrier sound demodulating system such that the tone quality of a reproduced sound signal is satisfactory, when receiving an ultra high frequency (UHF) signal, the tone quality can become unacceptable. In fact, when receiving UHF signals, the split-carrier sound demodulating system can produce an inferior tone quality compared to the intercarrier sound demodulating system.

For example, in Japan, the local oscillating frequency in the tuner is 58.75 MHz higher than a received signal frequency. If a received signal i.e., an input signal has a low level, the local oscillator of the tuner can stably or positively oscillate at a predetermined local oscillating frequency. If the input signal level becomes high, however, a disturbing wave is superimposed upon a frequency determining element such as a variable capacitor of the tuner local oscillator which results in the local oscillating frequency being forcibly shifted. That is, due to the influence of the high level of the video carrier, a so-called "pull-in" operation of the tuner local oscillator occurs.

It should be noted that the AGC is applied to the tuner in order to secure an acceptable S/N (Sound to Noise) ratio of the picture for both VHF and UHF input signals whenever the input signal level is 65 dBµ or more.

Thus when an input signal is at or above 65 dBu, the AGC will suppress and thereby significantly minimize the aforementioned pull-in operation of the tuner local oscillator. However, when the input signal is below 65 dBu, the AGC is inoperative. Thus for input signal levels just below 65 dBu, the pull-in operation can occur without being suppressed by the AGC. In such instances, if the input signal is at an ultra high rather than a very high frequency, the frequency determining element, such as the variable capacitor, will be more sensitive to the high level of the input signal resulting in much greater frequency fluctuation of the oscillator output signal and creating appreciable buzz noise interference. For example, the sensitivity of a variable capacitor at an ultra high as compared to a very high frequency can be raised by a factor of four. Therefore, in case of the UHF, the pull-in operation as set forth above occurs at an input signal level of about 60 to 60 dBµ which, cannot be suppressed by the AGC, the tuner local oscillating frequency will change in accordance with the input signal level. In a television receiver, since the video carrier is amplitude modulated (AM), the tuner local oscillating frequency fluctuates in response to the level of the video carrier. Then in the split-carrier sound demodulating system, when the fluctuations in the tuner local oscillating frequency occur, due to fluctuations in the UHF video carrier, the sound signal fluctuates and becomes buzz noise.

The degree of tone quality deterioration due to buzz noise, rapidly worsens when the AGC is ineffective as in the case of a UHF signal. After the buzz noise is detected and if the input signal level is further raised by about 5 dB, the tone quality deterioration even more severe as compared with the tone quality of the intercarrier sound demodulating system.

To prevent such deterioration the AGC of the UHF tuner must be arranged that the AGC such a manner becomes effective when the input signal level is still 50 to 60 dBµ. However, by lowering the threshold level which activates the AGC, the S/N ratio of the picture will deteriorate as set forth above and becomes unsuitable for practice. To prevent such S/N deterioration a buffer amplifier inserted between the local oscillator of the UHF tuner and the mixer can be used. However, it is quite difficult to design a buffer amplifier which is capable of covering the entire UHF range. Furthermore, even if such a design were possible, it would be quite difficult to produce such an amplifier at an attractive manufacturing cost. An additional problem arises in the split-carrier sound demodulating system due to amplitude to phase modulation (AM-PM) conversion prior to transmission of a signal. More specifically, since the video carrier as well as the sound carrier are modulated for phase in satellite multiple relaying broadcasting, in the intercarrier sound demodulating system, the phase modulated amount is cancelled whereby no buzz noise occurs. But, in the split-carrier sound demodulating system, since the sound carrier component modulated for phase is separated from the video carrier component and reproduced as it is demodulated, the phase modulated amount is not eliminated so that buzz noise occurs.

Thus as described above, neither the split-carrier nor the intercarrier sound demodulating system is always suitable for improving the tone quality of the television sound signal and each system has various defects. In order to take advantage of the best aspects from both systems, a television receiver, as used in the prior art and as illustrated in FIG. 3, can be used in which the sound signal is normally demodulated by the split-carrier sound demodulating system and in which the sound signal upon detuning is demodulated by the intercarrier sound demodulating system automatically or forcibly.

In FIG. 3, an output signal of tuner 2, which is controlled by channel selector 2', is supplied through a surface acoustic wave filter 15, having a video intermediate frequency selecting characteristics, to an amplifier 16. An output signal of amplifier 16 is supplied through a sound trap circuit 17 to a video detector 18 so as to produce a video detected output. Additionally, an output signal from amplifier 16 is applied to an automatic fine tuning (AFT) circuit 19, which detects a level of the video carrier and in accordance therewith varies the local oscillating frequency of tuner 2. Upon switching from one channel to another, a mute pulse M is generated from channel selector 2' and is supplied to AFT circuit 19 as well as to output amplifiers $PA_A$ and $PA_B$.

In FIG. 3, reference numeral 20 denotes the split-carrier sound demodulating system wherein the output of tuner 2 is supplied to a surface acoustic wave filter 21 so as to produce a sound carrier component having a frequency of 54.25 MHz, which is supplied to a mixer 23 through an amplifier 22. A local oscillator 24 supplies mixer 23 with a local oscillating signal of 64.95 MHz. Mixer 23 produces an output signal having a frequency equal to the difference between and/or the sum of the sound carrier component frequency of 54.25 MHz and local oscillating signal frequency of 64.95 MHz. The mixer output signal is supplied to a ceramic filter 25 from which a sound carrier component having a frequency of 10.7 MHz is produced and which represents the frequency difference between the sound carrier component and oscillating signal frequencies. The sound carrier component produced by ceramic filter 25 is supplied to and frequency-demodulated at a frequency discriminator 26 and a demodulated output signal therefrom is supplied through an amplifier 27 to multiplexed sound signal decoder 8. The oscillating frequency of local oscillator 24 is controlled by the output signal of frequency discriminator 26 so as to perform AFC.

Further, numeral 30 designates an intercarrier sound demodulating system in which a signal from amplifier 16 is supplied to a sound signal detector 31 and from which a sound carrier component of 4.5 MHz is produced and supplied to a frequency discriminator 32. Frequency discriminator 32 demodulates the 4.5 MHz sound carrier component and produces an output signal which is applied to decoder 8 through an amplifier 33.

The output of frequency discriminator 26 in demodulating circuit 20 of the split-carrier sound demodulating system is supplied to a comparator 41. When the local oscillating frequency in tuner 2 is altered, for example, by 250 KHz or more during fine tuning or the like, comparator 41 produces a detecting signal which produces a high level ("1") output signal. This detecting signal is applied to amplifiers 27 and 33 via an OR gate 42. When the detecting signal is not produced by comparator 41, the output signal derived from the amplifier 33 is muted, that is, inhibited and therefore is not supplied to decoder 8 resulting in the output signal of demodulating circuit 20 of the split-carrier sound demodulating system being supplied to decoder 8. When the detecting signal is produced by comparator 41, the output signal of amplifier 27 is muted and thereby inhibits supply thereof to decoder 8. That is, output signal provided by the demodulating circuit 30 of the intercarrier sound demodulating system is supplied to decoder 8. Thus amplifiers 27 and 33 comprise a selecting means.

As disclosed above, under normal receiving conditions, a detecting signal is not produced by comparator 41 resulting in the output signal demodulated by demodulating circuit 20 of the split-carrier sound demodulating system being supplied to decoder 8 whereby a television sound having no buzz noise is produced.

If, however, the local oscillating frequency is deviated beyond a predetermined value, during, for example, fine tuning of tuner 2 or other similar tuning adjustments thereto, the output signal demodulated by demodulating circuit 30 of the intercarrier sound demodulating system is supplied to decoder 8 due to a detecting signal being produced by comparator 41. Accordingly, the sound signal is never lost while the picture is produced on the screen of the television.

Furthermore, a terminal 44 is provided which can be supplied with a switching signal to change the demodulating of the receiver from split-carrier to intercarrier upon receiving a UHF signal. If necessary, a forced change-over switch (not shown) provided for use in switching to the intercarrier sound demodulating system. For example, this change-over switch is made ON when the buzz noise in the reproduced sound signal is remarkably noticeable. More specifically, a signal similar to the detecting signal derived from the comparator 41 is supplied to amplifiers 27 and 33 via terminal 43 of OR gate 42 whereby the output signal of amplifier 27 is muted so as to switch the mode of demodulating operation from split-carrier to intercarrier. That is, the receiver is forcibly switched to use demodulating circuit 30 and hence avoids the inherent drawbacks which exist when limited to use of the split-carrier sound demodulating system. As shown in FIG. 3, although the deviation in the local oscillating frequency of local oscillator 24 is detected in frequency discriminator 26 and comparator 41, it is also possible to detect for frequency deviation in a comparator 48 by using the output signal of AFT circuit 19 and resistors 46 and 47.

The prior art circuitry, as shown in FIG. 3, however, has an inherent drawback. More specifically, upon selecting a channel, AFT circuit 19 (which is analog type AFT circuit) vibrates about a desired video carrier during the pull-in operation thereof. Accordingly, until the output signal of AFT circuit 19 pulls in the desired frequency demodulating means 20 of the split-carrier sound demodulating system supplies transient sound signals having considerably large impulses to speakers $SP_A$ and $SP_B$. In particular, the impulse transient sound signals are affected by the magnitude of the instantaneous frequency deviation from the desired frequency of the local oscillating frequency of tuner 2 as represented by $f_L$.

In contrast thereto, when decoder 8 is supplied with the demodulated output signal of demodulating circuit 30 of the intercarrier sound demodulating sound system, the aforesaid impulse sound signals do not occur. That is assuming the video carrier frequency and sound carrier frequency are respectively represented by $f_p$ and $f_s$, then:

$$(f_p + \Delta f_L) - (f_s + \Delta f_L) = f_p - f_s = 4.5 \text{ MHz}.$$

Accordingly, it is understood that the impulsive sound signals are not produced by decoder 8.

During the pull-in operation of the desired video carrier it may be considered that while the output of the AFT circuit 19 is converged, channel selector 2' produces in addition to mute pulse M, a mute pulse having a pulse width larger (for example, one second) than the pulse width of mute pulse M and is delivered to output amplifiers $PA_A$ and $PA_B$. As noted previously with respect to FIG. 2, however, it is undesirable for the television receiver as shown in FIG. 3, to reproduce a picture on the screen when the sound signal is lost.

It may also be considered that in attempting to limit the transient impulses which occur during the pull-in operation, it is desirable to reduce the time constant of AFT circuit 19 to as small a value as possible so as to quicken the response time thereof. But, in order to prevent a pull-in misoperation of the AFT circuit 19, an AFT defeat time of (for example, 100 m sec.) is necessary which therefore prevents the time constant of AFT circuit 19 from being significantly reduced.

Furthermore, upon presetting the volume, speakers $SP_A$ and $SP_B$ similarly produce a transient impulse sound signal of considerably large magnitude.

OBJECTS AND SUMMARY OF THE INVENTION

Accordingly, it is an object of the present invention to provide a television sound receiver which improves the tone quality of a reproduced sound signal by not being limited to the use of a split-carrier sound demodulating system and which thereby avoids the foregoing disadvantages of the prior art.

More specifically, it is an object of the present invention to provide a new and improved television sound receiver which avoids transient impulse sound signals which can occur during channel selection and presetting of the volume and thereby produces a sound signal having good tone quality.

In accordance with an aspect of the present invention, a television sound receiver includes an input terminal for receiving a television sound signal, a tuner connected to the input terminal, a channel selector connected to the tuner, an intercarrier sound demodulating circuit connected to the tuner, a split-carrier sound demodulating circuit connected to the tuner, a sound signal output terminal, and a switching device for selectively connecting one of the intercarrier and split-carrier sound demodulating circuits between the tuner and the sound signal output terminal and the switching device. The switching device includes a timing generator connected to the channel selector for generating a pulse signal of a predetermined period responsive to a channel selection period of the channel selector, a first operational device for normally connecting the split-carrier sound demodulating circuit between the tuner and the sound signal output terminal, and a second operational device connected for connecting the intercarrier sound demodulating circuit operatively between the tuner and the sound signal output terminal during the predetermined period.

The above, and other objects, features and advantages of the present invention will be apparent from the following detailed description which is in conjunction with the accompanying drawings in which like references designate the same elements and parts.

BRIEF DESCRIPTION OF THE DRAWINGS

FIGS. 1, 2 and 3 are block diagrams of conventional, prior art television receivers which demodulate a television sound signal;

DETAILED DESCRIPTION OF THE PREFERRED EMBODIMENT

Figure 3:
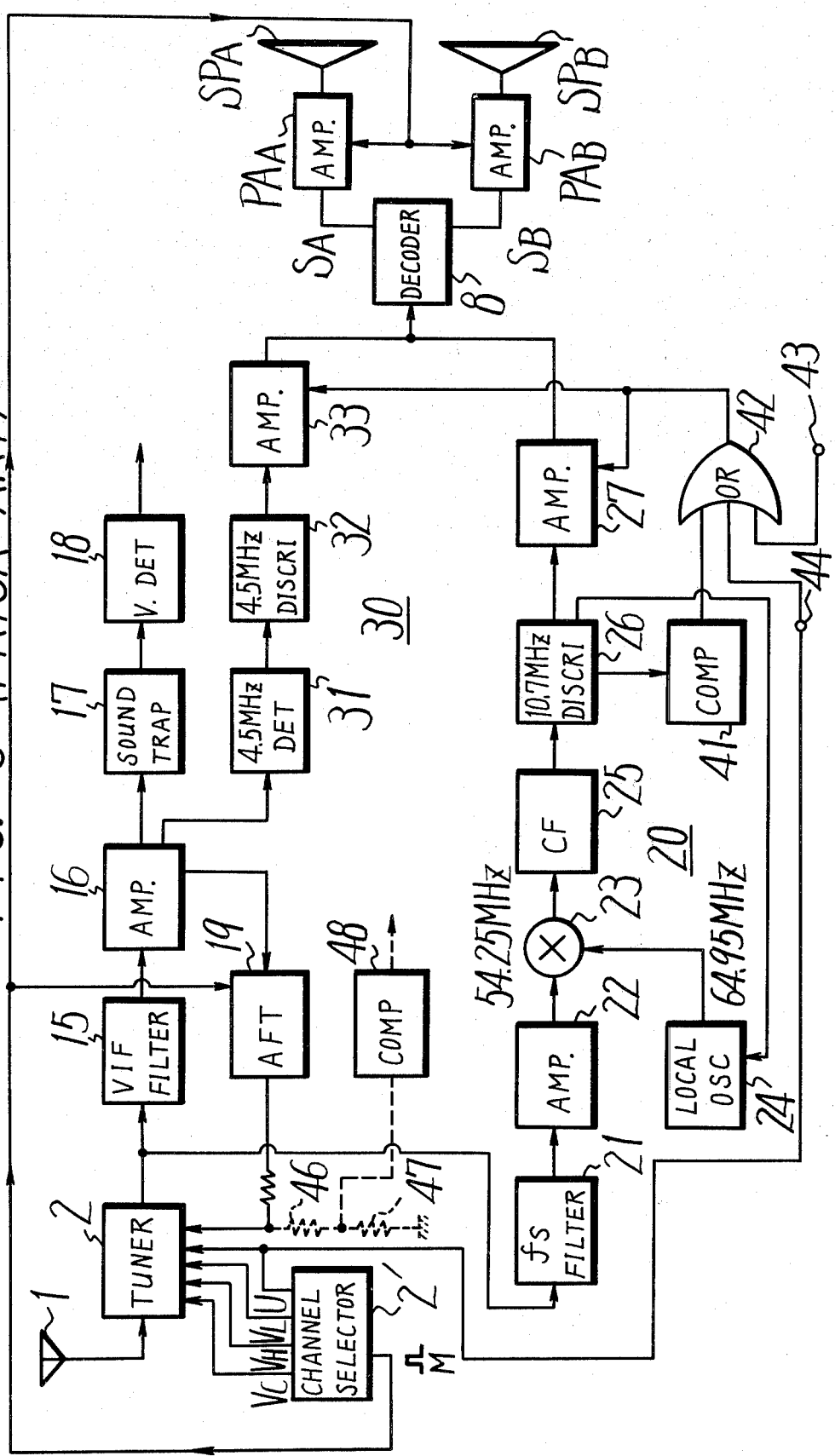
Figure 4:
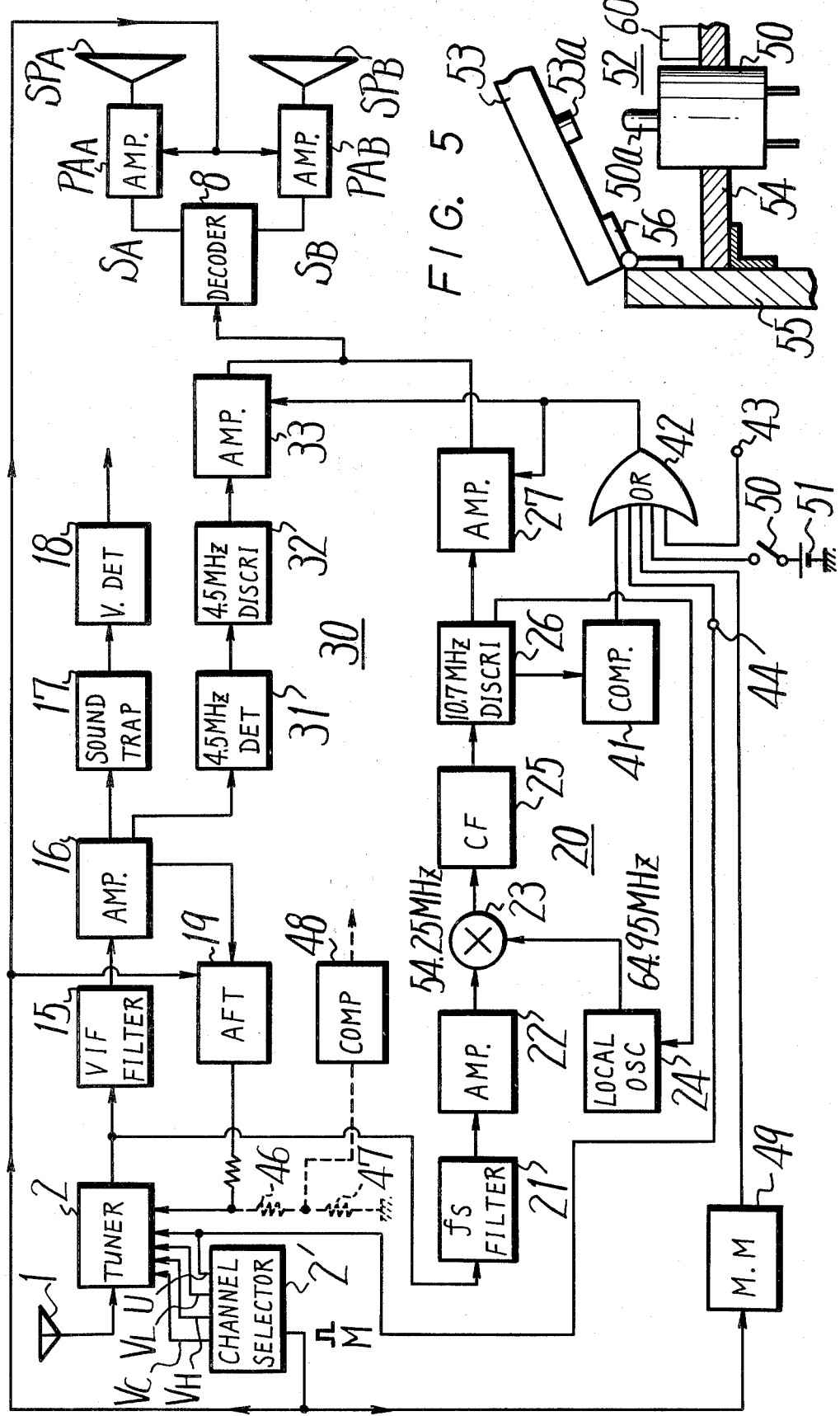
FIG. 4 is an exemplary block diagram of a television receiver which demodulates a television sound signal in accordance with the present invention.

The following description represents one embodiment of a television sound signal receiver accordance with the present invention with reference to FIG. 4. In FIG. 4, parts corresponding to those shown in FIG. 3 are marked with the same references and detailed explanations thereof will be omitted.

In this embodiment, mute pulse M generated from channel selector 2' is delivered to a trigger terminal of monostable multivibrator 49 having a time constant of, for example, one second. The time constant of monostable multivibrator 49 is selected so as to provide a frequency discriminator 26 and for comparator 41 to respond to the large frequency deviations during the aforementioned pull-in operation when changing channels. Also, an output signal of monostable multivibrator 49 is supplied to an input side of OR gate 42 through terminal 44. Accordingly, upon switching a channel, the output of monostable multivibrator 49 produces a high level signal "1" for one second which is supplied through OR gate 42 to the amplifiers 27 and 33, so that the output signal of amplifier 27 is muted and thereby provides a demodulated signal from demodulating circuit 30 of the intercarrier sound demodulating system to decoder 8.

Consequently, the transient impulsive sound signals caused by the slow response speeds of frequency discriminator 26 and comparator 41 are eliminated when switching from one channel to another channel by switching to an intercarrier sound demodulating mode of operation.

Figure 5:
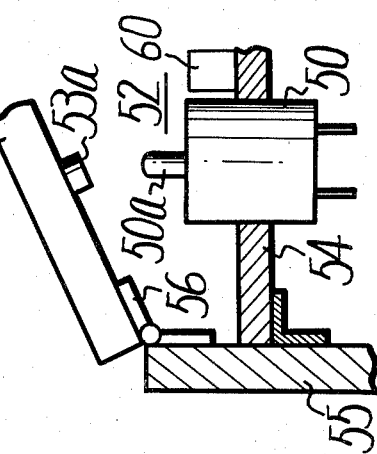
FIG. 5 is an exemplary cross-sectional view of a switching element shown in FIG. 4 which is in accordance with the present invention.

Furthermore, as illustrated in FIG. 5, a switching element 50 is provided which is actuated by and interlocked with the opening and closing movements of a cover 53 which is part of a housing portion 52. Cover 53 and housing portion 52 respectively form, for purposes of illustration, a concave shaped portion and a box-like portion provided in, for example, a front panel or side panel of the television receiver. Additionally, a channel selecting preset operating element 60 (which is coupled to a preset volume element though not shown in the figure) is provided in housing portion 52. Switching element 50 is provided with an actuator 50a. When the cover 53 is closed, a projecting member 53a which is located on the back of cover 53 depresses actuator 50a so as to make the switching element 50 switch to an electrically nonconductive state. When cover 53 is opened, actuator 50a is released from depression by moving projecting member 53a away from actuator 50a so as to switch switching element 50 to an electrically conductive state. Switching element 50 is attached to a plate body 54 and plate body 54 is attached to wall body 55. A hinge 56, which is attached to wall body 55 and cover 53 permits the latter to be freely opened and closed.

As shown in FIG. 4, switching element 50 is connected between a positive electrode of a voltage supply source 51, a negative electrode of which is grounded, and the input side of the OR gate 42.

When cover 53 of housing portion 52 is opened and the channel selecting preset operating element 60 is operated in order to adjust the preset volume element, the switching element 50 is turned ON so that a signal therefrom having a high level "1" is supplied to amplifiers 27 and 33 through OR gate 42 whereby the output signal of amplifier 27 is muted resulting in the demodulated signal of demodulating circuit 30 of the intercarrier sound demodulating system being supplied to decoder 8. Hence, the transient impulsive sound signals caused by the slow response speeds of frequency discriminator 26 and comparator 41 during adjustment of the preset volume are eliminated. Additionally, operation of the channel selection is confirmed inasmuch as the sound signal which is produced corresponds to, that is, is synchronized with the picture screen.

Other parts and elements of this invention as shown in FIG. 4 are arranged and operate as disclosed with reference to FIG. 3.

As described above, according to this invention, a television sound receiver produces a satisfactory tone quality which avoids the drawback of using only a split-carrier sound demodulating system. More specifically, the present invention eliminates the transient impulsive sound signals which occur during channel selection and presetting.

Having described a specific embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

We claim as our invention:
1. A television sound receiver comprising:
   an input terminal for receiving a television sound signal;
   a tuner connected to said input terminal;
   a channel selector connected to said tuner;
   an intercarrier sound demodulating circuit connected to said tuner;
   a split-carrier sound demodulating circuit connected to said tuner;
   a sound signal output terminal; and switching means for selectively and operatively connecting one of said intercarrier and split-carrier sound demodulating circuits between said tuner and said sound signal output terminal, characterized in that said switching means comprises a timing generator connected to said channel selector for generating a pulse signal of a predetermined period responsive to a channel selection period of said channel selector;

first operational means for normally connecting said split-carrier sound demodulating circuit operatively between said tuner and said sound signal output terminal; and second operational means connected to said timing generator for connecting said intercarrier sound demodulating circuit operatively between said tuner and said sound signal output terminal during said predetermined period.

2. A television sound receiver according to claim 1, characterized in that said switching means comprises a door switch operative when said channel selector is in a pre-set condition, and third operational means responsive to said door switch for connecting said intercarrier sound demodulating circuit operatively between said tuner and said sound signal output terminal when said channel selector is in a pre-set condition.

3. A television sound receiver according to claim 1, characterized in that said switching means comprises off-tuning detector connected to said tuner; and means responsive to the output signal of said off-tuning detector for connecting said intercarrier sound demodulating circuit operatively between said tuner and said sound signal output terminal during said off-tuning period.

4. A television sound receiver according to claim 1 further comprising:

a multiplexed sound decoder connected to said sound output terminal;

a pair of audio output terminals derived from said multiplexed sound decoder; and a pair of speakers connected to said pair of audio output terminals.

5. A television sound receiver according to claim 1 wherein said intercarrier sound demodulating circuit includes an intercarrier sound detector connected to said tuner, and a first frequency discriminator connected between said intercarrier sound detector and said sound output terminal; and said split-carrier sound demodulating circuit includes a selective filter connected to said tuner for selecting sound carrier component in an output signal from said tuner, a mixer circuit connected to said selective filter, a local oscillator connected to said mixer circuit such that a frequency converted sound carrier component is obtained from said mixer circuit, and a second frequency discriminator connected between said mixer circuit and said sound output terminal.

6. A television sound receiver comprising:

an input terminal for receiving a television sound signal;

a tuner connected to said input terminal;

a channel selector connected to said tuner;

an intercarrier sound demodulating circuit connected to said tuner;

a split-carrier sound demodulating circuit connected to said tuner;

a sound signal output terminal; switching means for selectively and operatively connecting one of said intercarrier and split-carrier sound demodulating circuits between said tuner and said sound signal output terminals; and a control box containing channel preset means connected to said channel selector and having a door covering the top thereof, characterized in that said sound receiver comprises a door switch activated when said door is opened during a channel preset operation, and said switching means is responsive to said door switch and connects said intercarrier sound demodulating circuit operatively between said tuner and said sound output terminal when said door is opened during said channel preset operation.

* * * * *